United States Patent [19]
Burdette, Jr.

[11] Patent Number: 5,170,745
[45] Date of Patent: Dec. 15, 1992

[54] PET CARRYING BAG

[76] Inventor: John C. Burdette, Jr., 7 Winterberry Ct., Glen Arm, Md. 21057-9131

[21] Appl. No.: 834,356

[22] Filed: Feb. 12, 1992

[51] Int. Cl.⁵ ............................................. A01K 29/00
[52] U.S. Cl. ..................................................... 119/19
[58] Field of Search ........................ 119/19, 96, 160; 224/270, 215, 209, 160, 161, 191, 920; D30/109, 108

[56] References Cited

U.S. PATENT DOCUMENTS

| | | | |
|---|---|---|---|
| D. 302,610 | 8/1989 | Slawinski | D30/109 |
| 3,850,144 | 11/1974 | Springer et al. | 119/19 |
| 4,644,902 | 2/1987 | Doyle | 119/19 |
| 4,977,857 | 12/1990 | Slawinski | 119/19 |

FOREIGN PATENT DOCUMENTS

| | | | |
|---|---|---|---|
| 2354727 | 6/1976 | France | 119/19 |
| 2476461 | 8/1981 | France | 119/19 |

Primary Examiner—Gene Mancene
Assistant Examiner—Thomas Price
Attorney, Agent, or Firm—Oliff & Berridge

[57] ABSTRACT

A lightweight, portable pet carrier for completely enclosing and transporting an animal. The carrier comprises an elongated rectangular bag having two elongated sides, two short sides, a bottom and a top, all formed of a washable open mesh material. The bag has a top positioned zipper closure and includes rigid bottom and side supports and an absorbent pad which are removably housed within side and bottom retention members. The bag includes a poly web strap on elongated sides of the bag. At least one side of the strap includes loop portions on a lower extremity of the bag for insertion of an automobile seat belt to restrain the carrier and the animal contained therein during automotive travel.

17 Claims, 3 Drawing Sheets

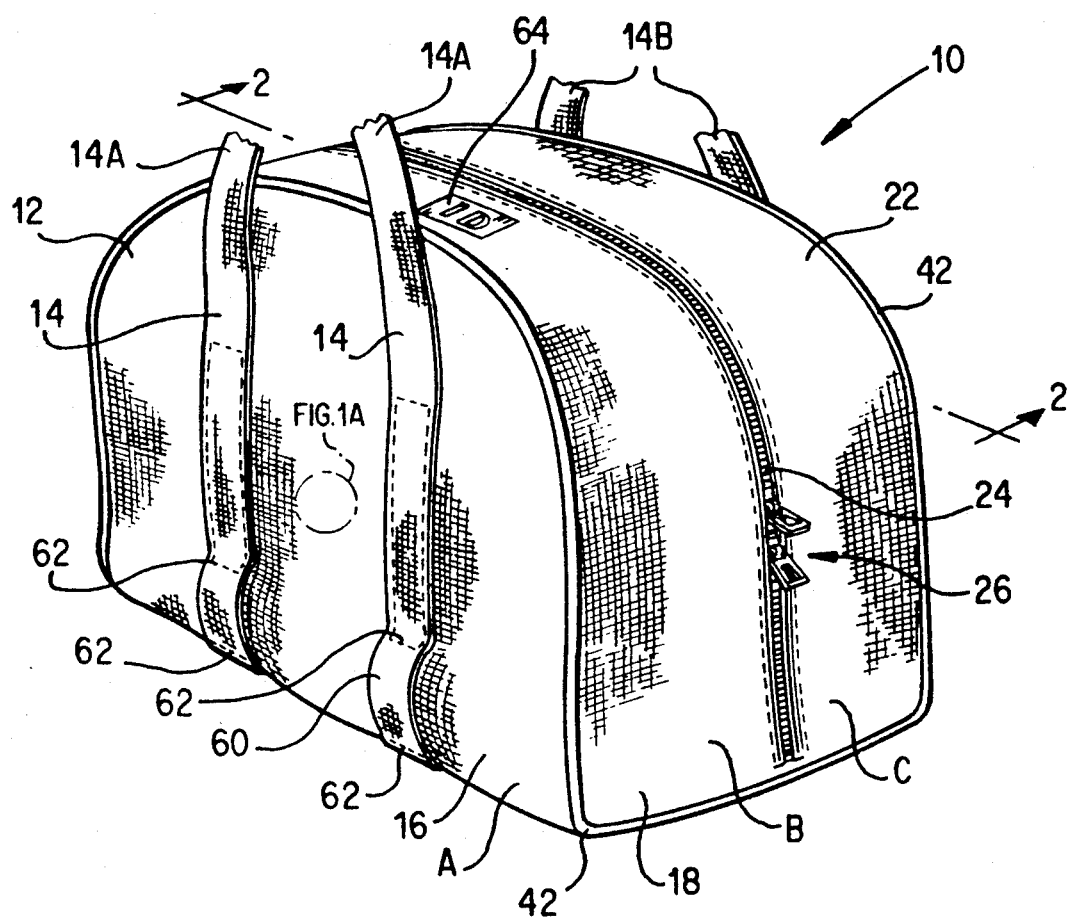
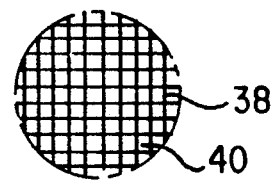
FIG. 1
FIG. 1A

PET CARRYING BAG

BACKGROUND OF THE INVENTION

1. Field of the Invention

The present invention relates to a portable, lightweight pet carrying bag which can be used whenever you need to carry a pet for extended distances such as on road trips, going on a walk, sailboating and taking the pet to the vet or boarding house.

2. Description of Related Art

U.S. Pat. No. 3,850,144 to Springer et al. discloses a pet carrier bag made from a durable woven fabric. The bag comprises a stiff, removable binder board covered with a plastic coating which forms a bottom for the carrier. An upstanding wall is secured to the board and receives an absorbent pad. The board and the pads are held within the bag by snaps. A top portion of the bag is zippered, while one side wall of the bag includes an opening through which a pet's head extends.

U.S. Pat. No. 4,977,857 and U.S. Design Pat. No. 302,610, both to Slawinski disclose a pet carrier bag which includes a flexible body having a zippered top portion. A closable pocket is provided on one side of the bag and the bag includes two carrying straps. The carrier provides either an opening for the animal's head to extend through or an open mesh that may be placed over the opening.

Other known pet carriers comprise bulky, heavy cages made of metals, plastics, or other hard materials. The size, weight and cost of these carriers severely limit their usefulness. Most are reserved only for long distance car traveling or air travel. Because of their size and weight they can not be easily carried, and as such are not practical for many occasions in which it is desired to transport a pet.

None of the known prior art pet carriers provide a lightweight, portable carrier which is designed to completely confine an animal. Additionally, none of the known pet carriers provide a pet carrier which is snag resistant, completely collapsible and easily washable, yet being capable of providing a firm, non-collapsible enclosure by the insertion of removable bottom and side supports. Further, none of the known pet carriers provide a means to attach the pet carrier to an automobile seat belt for safety during transportation.

OBJECTS AND SUMMARY OF THE INVENTION

It is an object of the present invention to provide a portable, collapsible animal carrier which can completely house a pet, the carrier being lightweight, convenient to use, washable, snag resistant, resistant to soiling or staining, capable of providing proper ventilation to the pet housed therein, and with adequate visual communication through the carrier to allow viewing into and out of the carrier.

It is another object of the present invention to provide a portable animal carrier which incorporates an easily removable bottom support made from a substantially rigid plastic material which can support the weight of an animal thereon, wherein the support is held in place by being located in a pocket which is sewn onto one bottom edge of the carrier such that the pocket is rotatable about the sewn edge to facilitate easy insertion and removal of the support.

It is another object of the present invention to provide a portable animal carrier which includes side internal pockets which can house side rigid supports to stabilize the carrier and prevent unwanted collapse of the sides of the bag such that a pet housed therein can have a defined living space which allows some movement within the carrier.

It is another object of the present invention to provide a portable animal carrier which allows convenient access to its interior by providing a double zippered opening extending the entire length of a top side and substantially down both short sides.

It is another object of the present invention to provide a pet carrier having a low cost, easily replaceable absorbent pad which can be loosely located on the bottom of the carrier or fixedly held within the bottom pocket.

These and other objects will become apparent from a reading of the following detailed description in connection with the drawings.

BRIEF DESCRIPTION OF THE DRAWINGS

The invention will be described in detail with reference to the following drawings wherein:

FIG. 1 shows a perspective view of a pet carrier according to the present invention;

FIG. 1A shows an enlarged view of a section of the pet carrier of FIG. 1 including its mesh construction;

DETAILED DESCRIPTION OF PREFERRED EMBODIMENTS

Figure 2:
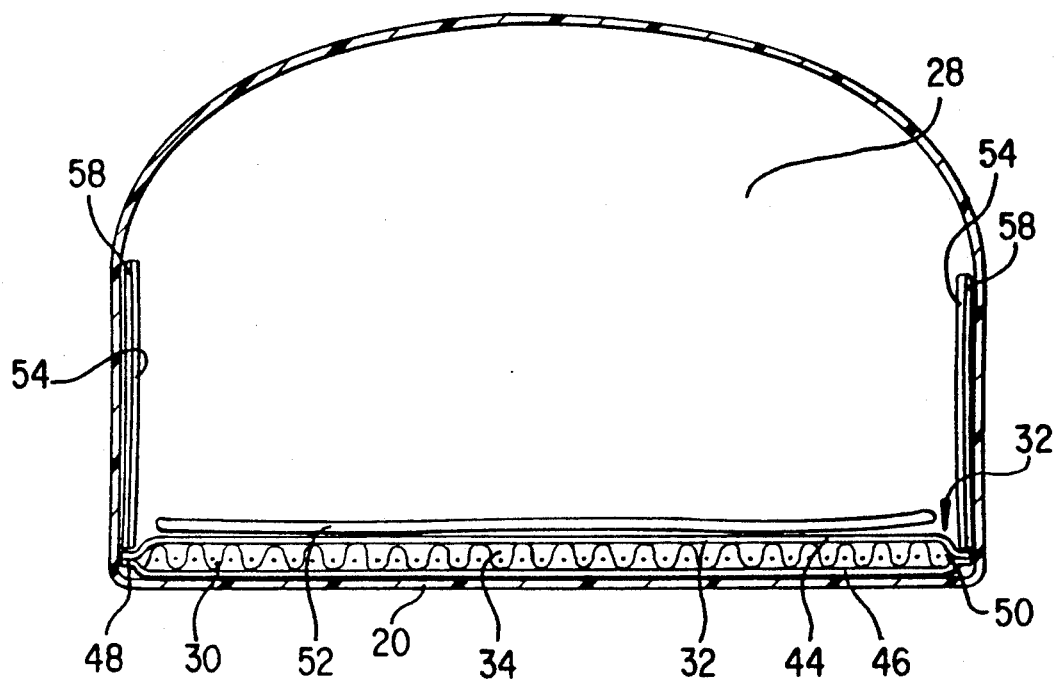
FIG. 2 shows a cross-sectional view of the carrier of FIG. 1 taken along section 2—2.

With reference to FIG. 1, there is shown a portable animal carrier 10 which is of a lightweight construction and is constructed to completely house a pet therein for travel purposes, such as automobile trips, taking the pet to the vet or boarding house, boating or other similar short term uses.

The animal carrier 10 includes a generally elongated bag 12 and carrying straps 14. The bag 12 includes two elongated sides 16, two short sides 18, a bottom 20, and a top 22, all of which are sized to accommodate an animal therein. Preferably, the bag is sized to accommodate a cat or small dog.

The bag 12 includes an opening 24 which extends across the entire longitudinal length of the top 22 and down both short sides 18 for substantially the entire length thereof. The opening 24 is releasably positionable between a fully open state and a fully closed state, or any intermediate portion thereof by a closure mechanism 26. The closure mechanism 26 may be any suitable mechanism used in the industry for bags. Examples of such are zippers, hook and loop fasteners (Velcro), etc. Preferably, non-corrosive zippers are used.

In a most preferred embodiment, twin zippers are utilized. The use of two zippers prevents partial opening of the carrier and also allows for controlled opening location and size. If the animal needs any adjustments made while in the carrier, the zippers can be positioned to a predetermined location and one may open the zippers a required amount to allow a hand to be inserted into the carrier to correct or make adjustments to the animal without creating a large opening which may allow the animal to escape the carrier. Such adjustments may be to pet or caress the animal, to feed or administer medication to the animal or just adjust the animal's relative position in the carrier.

The sides of the bag may take many forms and their specific external dimensions or shape do not form a critical part of the present invention. Although the shape of the bag of FIG. 1 shows a bag having a rectangular bottom 20 and generally elongated rectangular sides 16 of which an upper perimeter is convex, the bag 12 may be of any construction meeting the above requirements That is, a bag having two elongated sides and two short sides, a top and bottom, all of which sized to accommodate a small animal.

The bag 12 can be assembled by any of various techniques known in the art. For example, the most common method would be by stitching of adjacent edges. Once in its final assembled configuration, the bag 12 must be capable of securely housing and containing an animal in its entirety therein. The interior of the bag 12 forms an enclosed environmental living space 28 for the animal. Such an enclosed living space 28 must meet several criteria to provide a soothing, natural surrounding which does not harm, disturb, or in any other way affect the animal.

A first criteria is the capability of providing circulation of outside air into, through and out of the enclosed living space which is necessary for the proper respiratory needs of the animal. In prior systems, the animal's head was located external to the carrier, or the carrier included a breathing port near the animal's head which was usually either a mesh or some form of bars. Another criteria is the ability for the animal to see out of the bag to view it's surroundings and for the owner of the pet to be able to see into the bag to readily determine the condition of the pet located therein. Since the animal is free to move around the bag, it is preferred to be able to see the pet regardless of the pet's position within the bag. The first two criteria can be met by utilizing a moderately spaced mesh material for the bag. The mesh allows adequate airflow into the bag, while additionally providing visibility into the bag. By making all the sides from the mesh material the bag obtains a more uniform look and eliminates the requirement for a breathing port for the bag.

Additional criteria for the bag material, which are important to ensuring the utmost safety for the pet, include proper anti-fungal or other hygienic properties and abrasion or snag resistance. The pet may be prone to chewing or scratching on the bag and can have claws which snag and can rapidly deteriorate the integrity of the bag if normal carrying bag materials such as thin nylon or cotton are used.

In a preferred embodiment, the bag 12 is made from a vinyl coated mesh 38 such as Phifertex which is manufactured by Phifer Wire Products,, Inc. of Tuscaloosa, Alabama, as shown in FIG. 1A. Phifertex has a fungal resistance rating of zero, a tear strength of 90 lbs. in the warp and 70 lbs. in the fill based on a 17×12 construction and 1000 denier, a high abrasion resistance, and is colorfast. The material is easily cleaned by vacuuming, brushing or washing. This particular material provides a mesh having mesh holes 40 of about 1/16", although slightly smaller or moderately larger holes up to about $\frac{1}{8}$" are acceptable to provide proper ventilation and visual communication into and out of the bag 12.

Figure 3:
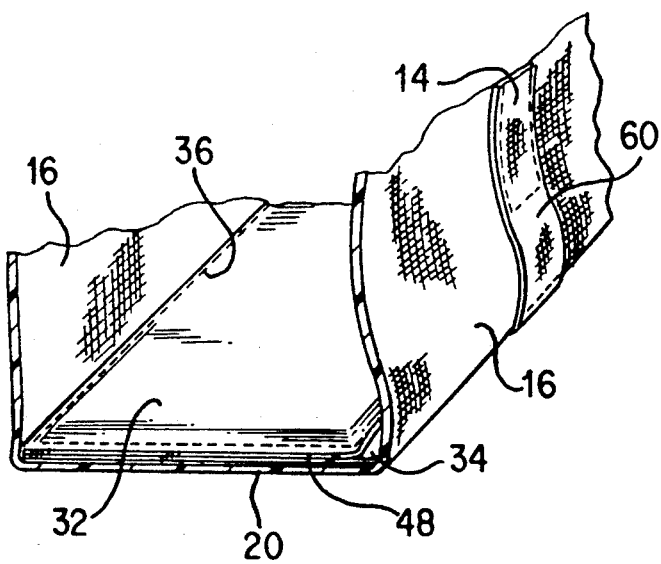
FIG. 3 shows a partial perspective cut-away view of the pet carrier according to the present invention.
Figure 4:
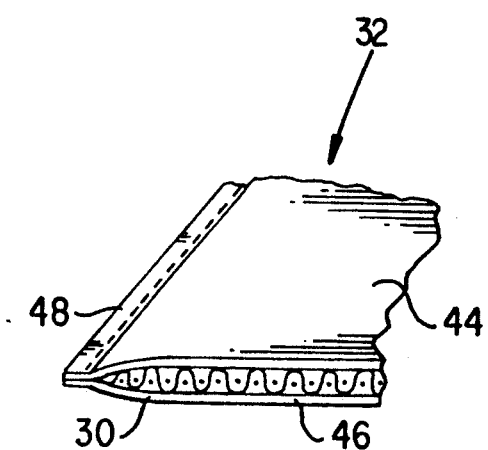
FIG. 4 shows a partial perspective view of a retention member of the pet carrier of FIG. 3.

With reference to FIG. 2, there is shown a cross-sectional view of the interior of the enclosed living space 28 of the carrier 10. In order to firmly support the weight of the animal, the carrier 10 requires a stiff bottom. To aid in the ease of washing or cleaning the bag 12, the stiff bottom must be easily removable. The present invention provides for an easily removable rigid support 30 which is housed within a simple, low cost retention member 32 to form the stiff bottom. The retention member 32 comprises an open-ended flat enclosure 34 which is secured at one end to the bottom 20 of the bag 12. The retention member 32, as better shown in FIGS. 3 and 4, is pivotable about stitch line 36 to provide access to the enclosure 34 to install or remove the rigid support 30. Upon positioning the retention member 32 along the bottom 20 of the bag 12, the rigid support 30 is contained by the retention member 32 on three sides and by one of the elongated side walls 16 on a fourth side. The support 30 is preferably made of plastic so as to be resistant against moisture, pet wetting, aging, snagging, etc. More preferably, the support 30 is corrugated to further strengthen the support while allowing the support thickness to be reduced, thus lightening the overall weight of the carrier.

The straps 14 of the bag 12 are located on both elongated sides 16 of the carrier 10. The straps 14 can be of any material sufficiently strong to support the weight of the animal and the carrier. Preferably, the bag straps 14 are made from heavy poly webbing, similar to that used in seat belt construction. The straps 14 are suitably fastened to the bag 12 by stitching or the like.

The bag 12 is made from three pieces of fabric A, B and C as shown in FIG. 1. Piece A is sized to form both elongated sides 16 and the bottom 20 when assembled. Pieces B and C are narrow strips which form portions of the two short sides 18 and the top 22. When assembled, the pieces B and C are attached to piece A and are mated along one edge adjacent to each other to provide the opening 24. The pieces A, B and C are preferably sewn together at overlapping edges and the edges are covered with a bias tape 42 to cover the seams. The adjacent edges of pieces B and C each include portions of the closure mechanism 26. Preferably, the closure mechanism 26 is a dual zipper which is sewn onto the edges as is known in the art. In this embodiment, the opening 24 extends across the entire top 22 and additionally down the entire short sides 18. Alternatively, the bag 12 may be constructed by utilizing one piece in place of pieces B and C and the opening 24 may be cut in the piece to accommodate any size length of the opening 24 and the closure mechanism 26 may be attached as previously described.

The retention member 32 is formed of one or more pieces of material, preferably a top and bottom piece 44 and 46, respectively. The pieces 44,46 are sized to fit within the bottom 20 of the bag 12 as shown in FIG. 2. Preferably, as shown in FIG. 4, the top and bottom pieces 44,46 are stitched along two opposing edges 48,50. The sewn top and bottom pieces 44,46 of the retention member 32 are then inserted into and against the bottom 20 of the bag 12 on an interior side thereof. The retention member 32 is sewn on a third side, which is perpendicular to the opposed edges 48,50 previously stitched, through both top and bottom pieces 44,46 and through the bottom 20 of the bag 12 to hingedly attach the retention member 32 to the bag 12. By sewing the retention member 32 to the bag 12 on only one side, the retention member 32 is capable of pivotable movement about the axis of the sewn third side (stitch line 36) and forms an enclosure 34 between the top and bottom piece 44,46, accessible by the fourth unsewn side, as shown in FIGS. 3 and 4. Rigid support 30, preferably formed from corrugated plastic, is sized to fit within the enclosure 34 to provide a bottom support for supporting the weight of the animal. The rigid support 30 is easily installed or removed from the enclosure 34 by pivoting the retention member 32 about the third side sew line (stitch line 36) to a vertical orientation with the open fourth side now being located near the opening 24 of the bag 12. When the retention member 32 is returned to a horizontal position lying flat against the bottom 20 of the bag 12, the rigid support 30 is restrained from exiting the retention member 32 on the one open side thereof by one of the elongated sides 16 of the bag 12.

The retention member 32 may be made from the same material as the rest of the bag 12, or may be made from other suitable material. Preferably, the bottom piece 46 of the retention member 32 is made from an inexpensive water resistant non-mesh fabric such as lightweight plastic to reduce any moisture leakage into or out of the bag.

To prevent or substantially reduce any leakage of animal urine or feces which may occur, the bottom 20 of the bag 12 preferably includes a replaceable, low cost absorbent pad 52 such as a hospital pad. Various sizes of absorbent pads are on the market and provide a low cost replaceable way to reduce leakage onto or out of the bag 12. The absorbent pad 52 may either be placed directly on top of the retention member 32 or, if the bag material is colorfast and resists staining and wetting, the absorbent pad 52 may be inserted into the enclosure 34 of the retention member 32 on top of the rigid support 30. By utilizing a readily available absorbent pad, the cost of the carrier and the ultimate cost to the consumer after replacement of numerous pads can be greatly reduced.

The straps 14 are formed from a single strip of a poly-webbing material and attached substantially as shown in FIG. 1 to form two handle portions 14A and 14B which can be grasped to carry the bag 12. Preferably, the webbing is sewn to the bag 12 along a large portion of the elongated sides 16 of the bag 12 and double stitched along a top portion thereof to secure the webbing to the bag 12 and accommodate safe transport of the animal held therein.

Figure 5:
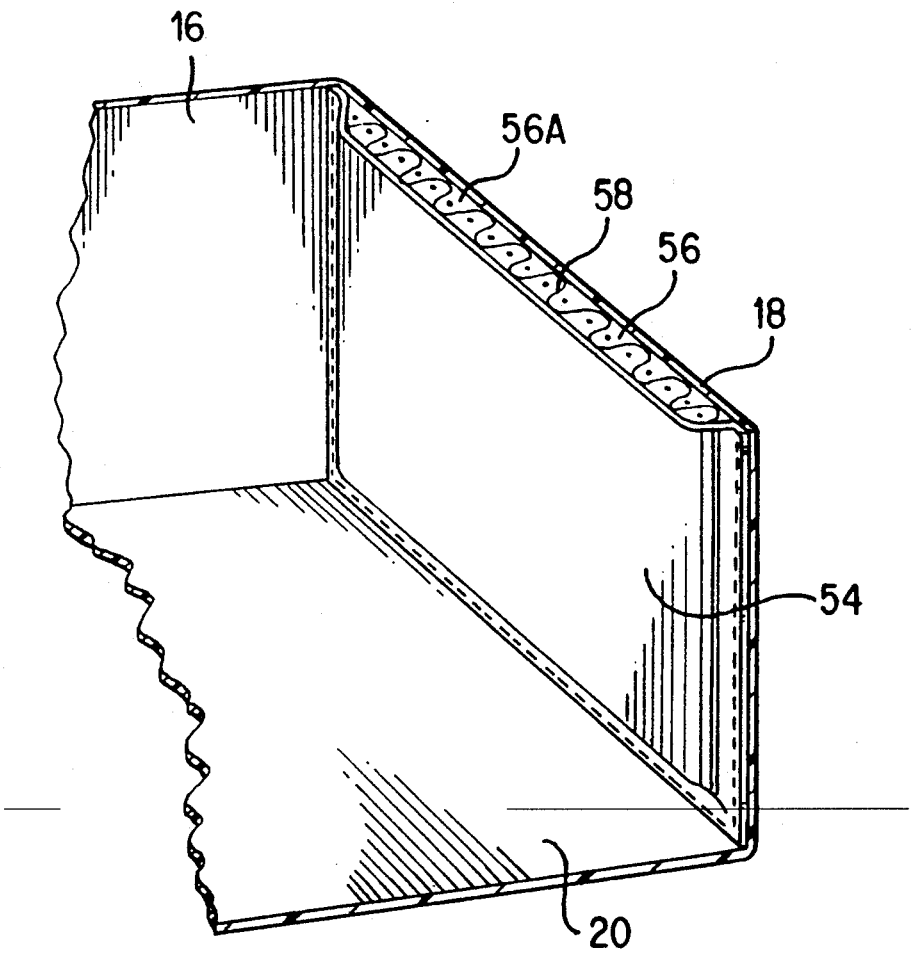
FIG. 5 shows a partial perspective cut-away view of an alternative embodiment of the present invention.

In a second embodiment, as shown in FIGS. 2 and 5, the bag 12 includes side retention members 54 which may be located on opposing short sides 18 of the bag 12 or on all sides of the bag 12. The side retention members 54 comprise a piece of material having a size equal to or slightly larger than the respective side on which it is placed. The pieces of side retention members 54 are sewn onto a respective side of the bag 12 along vertical edges and a bottom horizontal edge of the respective side on which the piece is located. This forms a pocket 56 between the side of the bag 12 and the side retention member 54. The pocket 56 is open at a top edge 56A thereof for insertion of side supports 58 which may be of the same material as the bottom support 30. The removable side supports 58 allow the bag 12 to be capable of providing an enclosed living space 28 which maintains its overall shape and will not completely collapse onto the animal.

In a third embodiment, either of the above two embodiments may be modified for secure car travel by incorporating a loop 60 in the straps 14 of the bag 12 near a lower extremity of the bag 12. The loop 60 allows easy attachment of a seat belt (not shown) between the bag 12 and the straps 14 to securely restrain the portable carrier 10 and the animal contained therein from abrupt motions, such as those caused by an accident. The loop 60 should have a length of between two to four inches to allow insertion of the seat belt while minimizing the amount of slack between the bag 12 and the seat belt when a force is applied to the bag 12. Preferably, the loop 60 is formed by leaving a two inch portion of the strap 14 near a lower extremity of the bag 12 unsewn. Immediately below and above this portion, horizontal stitches 62, preferably doubled, are sewn to provide support for the loop 60.

Additionally, the bag may include side external pockets for holding necessary items such as pet food, medication, towels, absorbent pads, and an identification pouch 64 located on an upper portion of the bag.

The invention has been described with reference to the preferred embodiments thereof, which are illustrative and not limiting. Various changes may be made without departing from the spirit and scope of the invention as defined in the appended claims.

What is claimed is:

1. A lightweight, portable animal carrier for completely enclosing and transporting an animal, the carrier comprising:

an elongated rectangular bag having two elongated sides, two short sides, a bottom and a top which are sized to define a living space containing an animal therein, said bag consisting essentially of a washable open mesh material;

an opening extending across the entire longitudinal length of said top and extending substantially entirely down said short sides;

closure mechanism for releasably providing secured closed state and an open state of said opening;

a carrying strap located on both elongated sides, each strap being fastenably attached to respective said elongated sides;

a support retention member comprising an upper and lower layer, said layers being attached on three sides thereof to provide an enclosure therein accessible through a fourth unattached side; and a thin, rigid, lightweight, removable plastic support sized to fit within said enclosure of said support retention member, said support capable of supporting the animal thereon, wherein said support retention member is fixedly attached at one side thereof to said bottom of said bag along one side thereof so as to hingedly attach said support retention member allowing rotation of said support retention member about said hingedly attached side, thereby providing easy access to said enclosure of said member for insertion or removal of said rigid support.

2. The animal carrier of claim 1, wherein said material is an abrasion resistant, washable material which exhibits sufficient ventilation for the animal.

3. The animal carrier of claim 1, wherein said plastic support is corrugated.

4. The animal carrier of claim 1, wherein said support retention member includes a replaceable absorbent pad located on a surface thereof.

5. The animal carrier of claim 1, wherein said support retention member includes a replaceable absorbent pad within said enclosure.

6. The animal carrier of claim 1, wherein said closure mechanism is a zipper which is movable along said opening to provide the open state and the closed state.

7. The animal carrier of claim 1, wherein said open mesh material provides sufficient ventilation with outside air to support the respiratory function of the animal contained within the carrier while the opening is in the closed state.

8. The animal carrier of claim 1, wherein said open mesh material is sized to allow visual communication into and out of the bag through the material.

9. The animal carrier of claim 1, wherein said mesh material is a vinyl coated mesh having a mesh hole size of about 1/16".

10. The animal carrier of claim 1, wherein at least one of said carrying straps is fixedly attached to one of said elongated sides in a discontinuous fashion so as to provide a loop portion of said strap, located near a lower extremity of said elongated side, said loop portion being defined between fixedly attached portions of said strap, said loop portion providing a means for attaching said bag to a seat belt mechanism of an automobile.

11. The animal carrier of claim 10, wherein said loop portion has a length between fixedly attached portions of between 2 and 4 inches.

12. The animal carrier of claim 1, further including:
side support retention members located on an interior of said sides and fixedly attached on side and bottom edges of said retention members to said sides so as to define accessible pockets between each member and the corresponding side to which it is attached; and
a plurality of thin, rigid, lightweight, removable plastic corrugated supports, said supports being sized to fit within said pockets and said support retention enclosure to provide removable rigid support structures for said bag.

13. A lightweight, portable animal carrier for completely enclosing an animal, the carrier comprising:
an elongated rectangular bag having two elongated sides, two short sides, a bottom and a top which are sized to define a living space containing an animal therein, the bag comprising an abrasion resistant, washable material which exhibits sufficient ventilation for the animal;
an opening extending across the entire longitudinal length of said top and extending substantially entirely down said short sides;
a zipper movable along said opening to provide the opening with a closed state and an open state;
a carrying strap located on both elongated sides, each strap being fastenably attached to respective said elongated sides;
a support retention member comprising an upper and lower layer, said layers being attached on three sides thereof to provide an enclosure therein accessible through a fourth unattached side, said support retention member being hingedly attached at one side thereof to said bottom side of said bag along an edge thereof so as to allow rotation of said support retention member about said hingedly attached side, thereby allowing easy access to said enclosure of said retention member;
side support retention members located on an interior of said sides and fixedly attached on side and bottom edges of said retention members to said sides so as to define accessible pockets between each member and the corresponding side to which it is attached; and
a plurality of thin, rigid, lightweight, removable plastic corrugated supports, said supports being sized to fit within said pockets and said support retention enclosure to provide removable rigid support structures for said bag.

14. The animal carrier of claim 13, wherein said side support retention members are located on said short sides of said bag.

15. The animal carrier of claim 13, wherein said side support retention members are located on said elongated sides of said bag.

16. The animal carrier of claim 13, wherein said side support retention members are made from a lightweight, water resistant material.

17. The animal carrier of claim 13, wherein said lower layer of said support retention member is made from a lightweight, water resistant material.

* * * * *